Aug. 13, 1946.   H. SCHMITT   2,405,907
ELEVATING AND STEERING MECHANISM FOR AIRCRAFT
Filed April 14, 1943   3 Sheets-Sheet 2
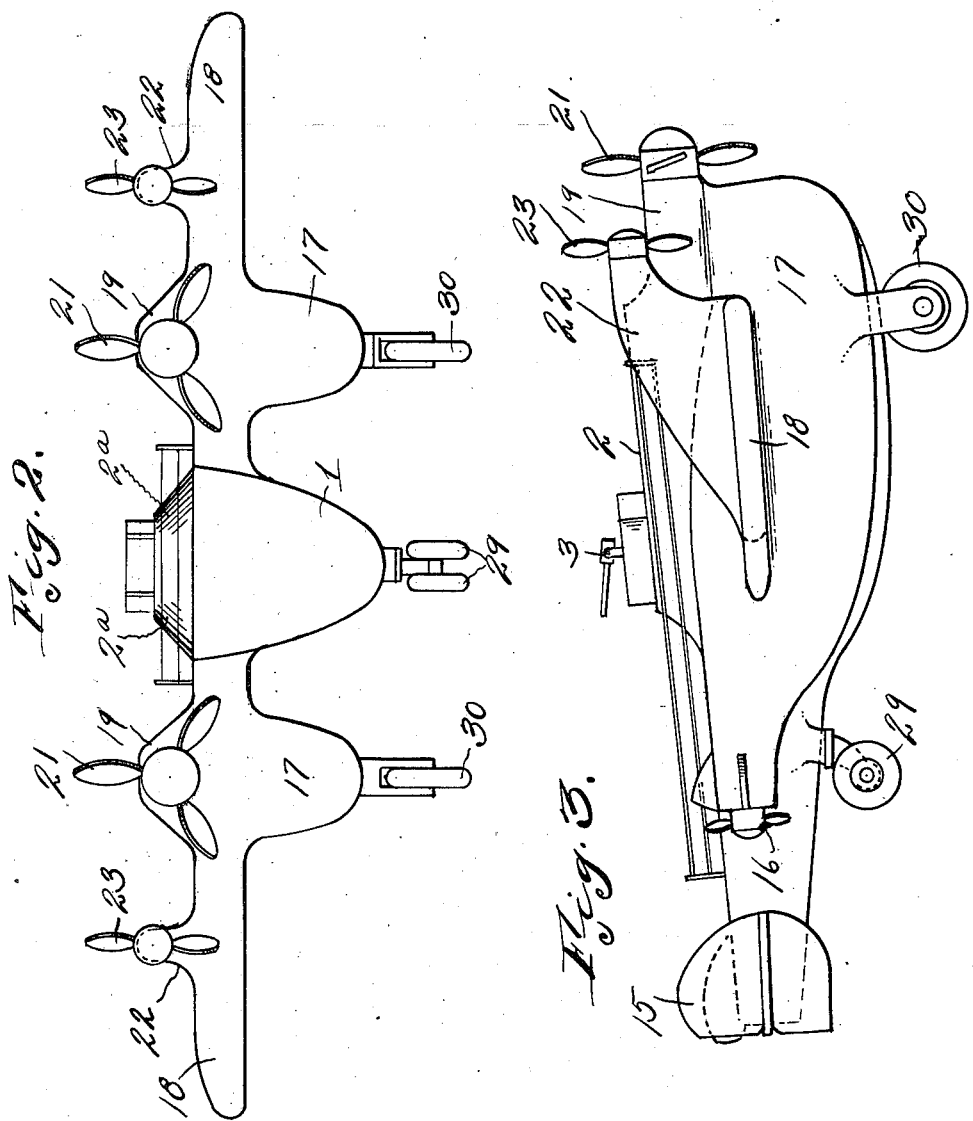
Inventor
Herman Schmitt
By Philip A. H. Terrell
Attorney Aug. 13, 1946.　　　　H. SCHMITT　　　　2,405,907
ELEVATING AND STEERING MECHANISM FOR AIRCRAFT
Filed April 14, 1943　　　3 Sheets-Sheet 3
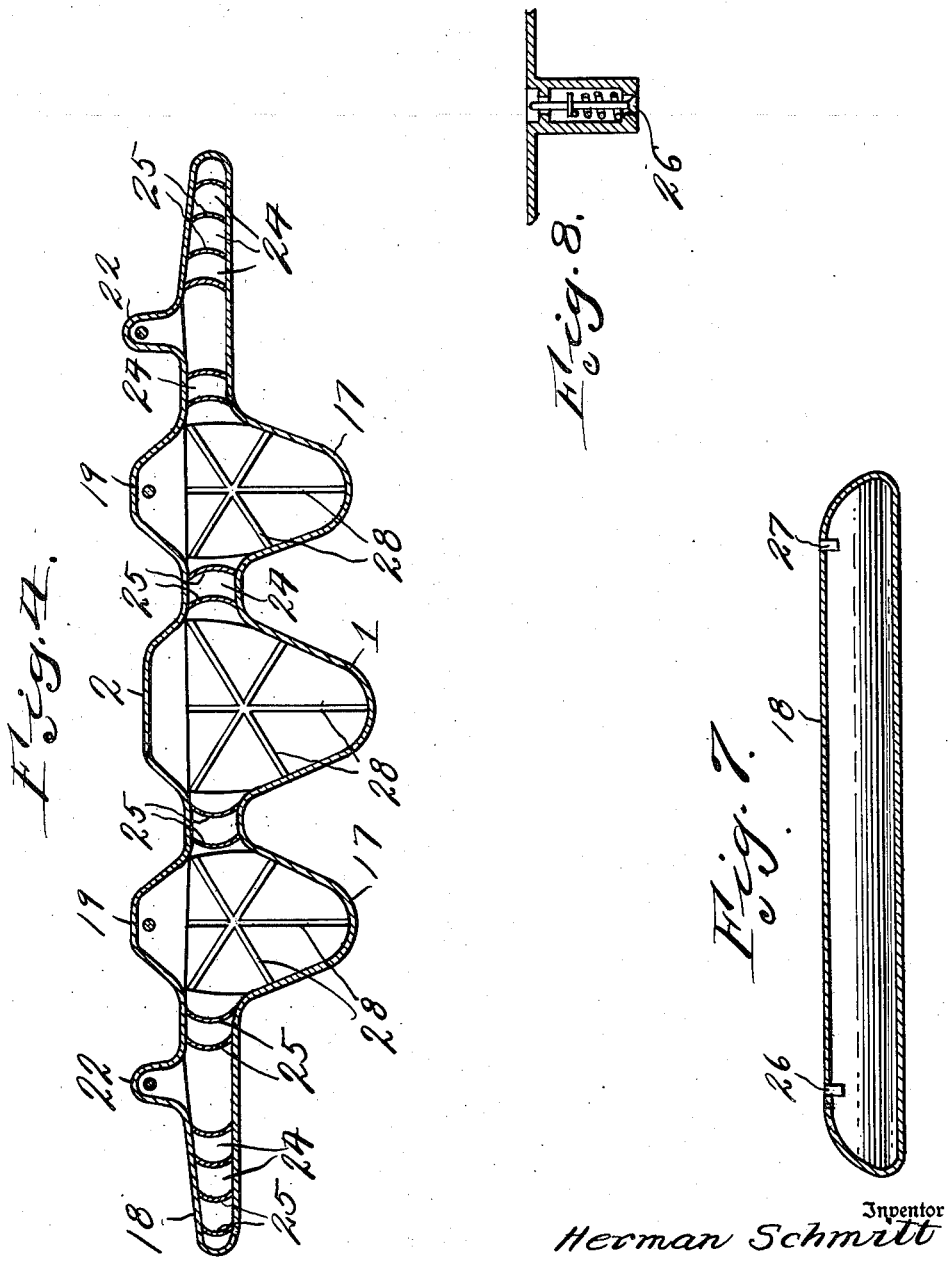
Inventor
Herman Schmitt
By Philip A. Purrell
Attorney Patented Aug. 13, 1946

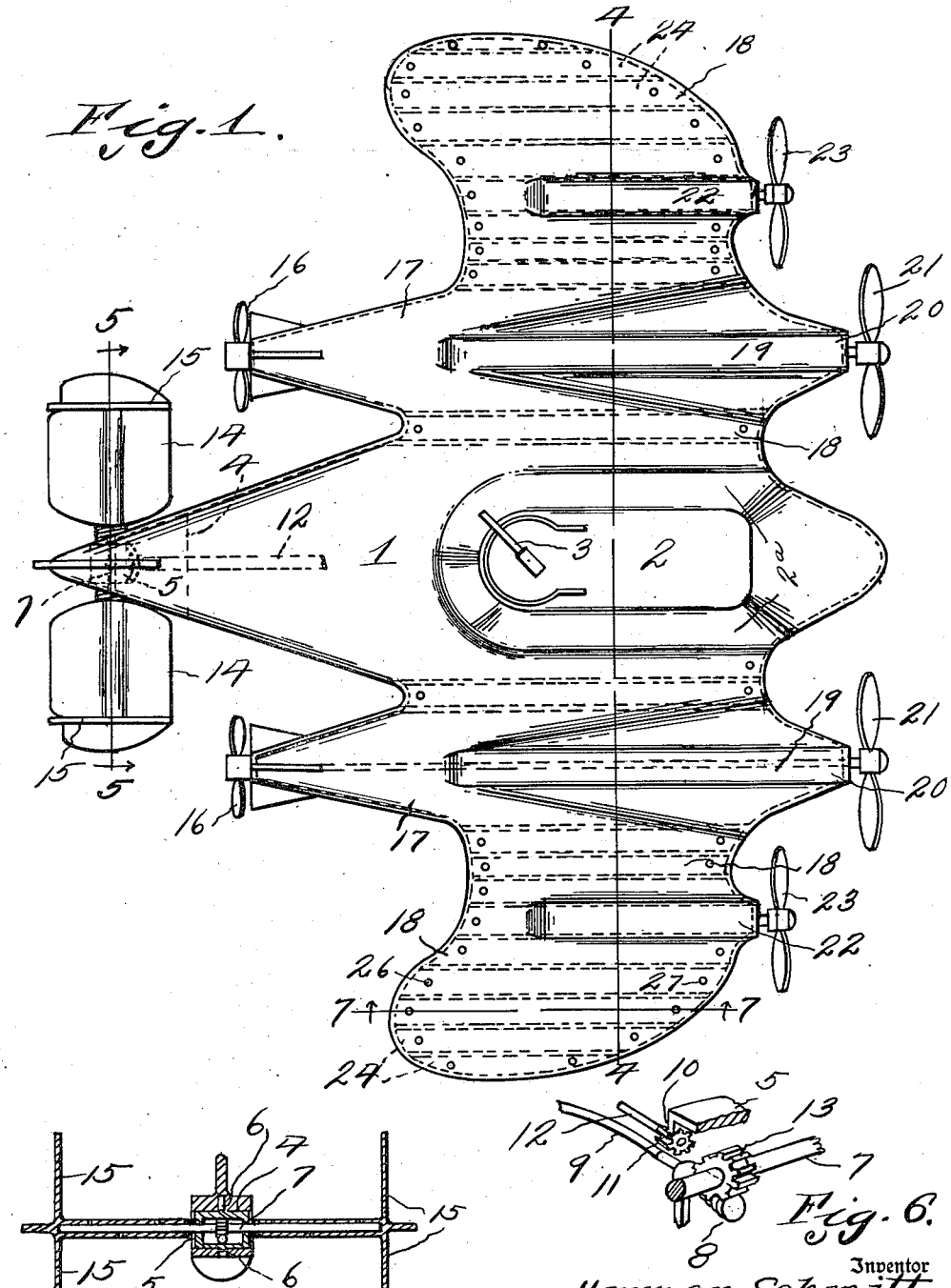

2,405,907

UNITED STATES PATENT OFFICE 2,405,907

ELEVATING AND STEERING MECHANISM FOR AIRCRAFT

Herman Schmitt, Sheboygan, Wis.

Application April 14, 1943, Serial No. 483,018

1 Claim. (Cl. 244—88)

The invention relates to airplanes and has for its object to provide a combination streamlined tri-aircraft involving three airplane bodies, all connected together and formed in a wing structure, thereby getting maximum lifting and propelling power under all conditions.

A further object is to provide a combined airplane, sea plane and glider, partially gas sustained so that the maximum speed can be obtained therefrom at all times.

A further object is to mount all of said bodies with their power plants in a single wing structure having sufficient wing area to sustain the device in flight.

A further object is to provide a triple motored airplane having triple bodies, and the outer bodies with means for propelling the airplane through the air or when resting on the water and additional safety engine bodies on the upper sides of the wings to the outer sides of the side bodies, thereby providing additional safety power for propelling the airplane when desired, for instance when any of the main motors are disabled.

A further object is to provide the various bodies and the wings with gas receiving pockets, which pockets may be filled with helium gas, thereby allowing the device to be partially gas sustained for use as a glider and without the operation of the motors if desired.

A further object is to provide a partially gas sustained multi-motored combined airplane, sea plane and glider, motor driven.

A further object is to provide the airplane with independent pockets for the reception of a sustaining gas for reducing the power necessary to drive the airplane, and at the same time as a safety measure to prevent falling of the airplane if one or more pockets are punctured by gun fire.

A further object is to form the gas pockets between spaced partitions, bowed in transverse cross section, thereby allowing the upper and lower sides of the wings to expand and contract incident to strains, stresses and temperature changes without rupturing the partitions. Also to provide valve means whereby gas may be forced into the gas pockets.

A further object is to provide the rear end of the central fuselage with a transverse shaft carrying the steering mechanism and means for rotating and also swinging said shaft in a horizontal plane, thereby allowing the mechanism to be used for steering the airplane while in air or on the water.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a top plan view of airplane.

Figure 2 is a front elevation of the airplane.

Figure 3 is a side elevation of the airplane.

Figure 4 is a vertical transverse sectional view taken on line 4—4 of Figure 1.

Figure 5 is a vertical transverse sectional view taken on line 5—5 of Figure 1.

Figure 6 is a detail perspective view of the gear control for the elevating and steering mechanism.

Figure 7 is a vertical sectional view through one of the wing ends taken on line 7—7 of Figure 1.

Figure 8 is a sectional view through one of the inflating valves.

Referring to the drawings, the numeral 1 designates the central fuselage, the upper side of which is provided with a gun platform 2 on which a gun 3 is mounted. The rear end of the fuselage 1 is provided with a transverse bifurcation 4 in which is pivotally mounted a block 5, on pintles 6, and rotatably mounted in the block 5 is a shaft 7, which shaft is adapted to be rotated on its axis, through the medium of a worm 8 carried by a flexible operating shaft 9, which may lead to any suitable operating mechanism.

The upper side of the block 5 is provided with a gear segment 10, with which a gear 11 meshes, and it will be seen that when the shaft 12 is rotated the block 5 will swing on its pintles 6. Worm 8 meshes with a worm gear 13 carried by the shaft 7, hence it will be seen that the elevators 14 may be moved for directing the airplane as a whole upwardly or downwardly, and when the airplane is on the water the vertical fins or rudders 15 may be moved for steering the airplane over the water, and at which time the airplane is propelled by the marine propellers 16, carried at the rear ends of the side fuselages 17. It will also be noted that the fins or rudders 15 may be utilized for steering the airplane when in the air, and at which time the block 5 is pivotally moved on its pintles 6.

It will be noted that the three fuselages 1 and 17 are built into a substantially single wing structure thereby forming a rigid structure, however the upper sides of the side fuselages 17 extend above the wings 18 and extend above the wings as at 19 and are adapted to have power plants therein. The forward ends of the fuselages 17 project forwardly of the wings as at 20, and the power plants drive puller type propellers 21 in the usual manner. Extending upwardly and forwardly on the upper sides of the wings 18 are housings 22 for auxiliary power plants which drive the puller type propellers 23. These auxiliary power plants are primarily for use in case of emergency.

The airplane is principally designed as a combined airplane, glider and sea plane and for wide range operation, and this wide range operation is made possible by providing the wings with a plurality of longitudinally extending gas pockets 24, which are filled with gas, preferably helium, thereby assisting in maintaining the airplane sustained in the air, and reducing the amount of power necessary to propel the airplane through the air or over the water, as it is obvious that when the airplane is on the water the lifting power of the gas would reduce the draft of the airplane. The gas chambers 24 are formed by transversely bowed partitions 25, and by bowing the partition it will be seen that the upper and lower walls of the wing will be sufficiently braced and at the same time there will be sufficient flexibility to allow the wing structure to adjust itself to changes in temperature without rupturing the partitions. Each compartment 24 is filled through a valve 26, and an exhaust valve 27 is provided in connection with each compartment so that the air can be expelled therefrom as the gas is forced therein. The valve structures are of conventional form.

The fuselages 1 and 17 are preferably provided with cross bracing 28, which in connection with the partitions 25 form a rigid structure and one which adapts itself to a large plane construction.

The landing gear comprises double wheels 29 carried by the forward under side of the fuselage 1, and the rear steering wheels 30 carried by the under rear side of the fuselages 17, therefore it will be seen that there is a tripodal wheel support for the airplane when it lands on a runway, and that the machine will not tip from side to side. This particular landing gear arrangement is an essential one for large machines of the cargo type. The forward ends of the fuselages 1 and 17 are streamlined so as to reduce as far as possible wind and water resistance according to the use of the machine, and for increasing the speed. It will be noted that the platform 2 is in a plane above the fuselage 1, and that the platform merges into the walls 2a, which in turn flare downwardly and merge into the upper side of the fuselage 1 at the upper side of the wing. It is to be understood that various doors and cargo doors may be provided in the various fuselages, and any type motors may be used for driving the propellers as well as the marine propellers.

From the above it will be seen that an airplane is provided which can be used in the air or propelled on the surface of the water, and one wherein the airplane is lightened by its various gas receiving compartments, thereby allowing long range operation and lifting power particularly when it is used as a cargo carrier and that the bowed compartment partitions not only brace the same but also allow a limited amount of flexibility to the structural parts without danger of rupturing riveted or welded connections. The wings and body can be formed from sheet metal or other material, and applicant does not limit himself in this particular.

The invention having been set forth what is claimed as new and useful is:

An elevating and steering mechanism for the tail end of an airplane fuselage, said mechanism comprising a pivotally mounted block in a bifurcation in said tail end and vertically pivoted on the longitudinal center of the airplane, a transverse rotatable shaft mounted in said block and extending to opposite sides of the tail, elevating members carried by said shaft at opposite sides of the tail end, vertically disposed steering members carried by said elevating members, a gear carried by said shaft within the pivoted block, a worm gear within the block and meshing with said gear and adapted to rotate said shaft, a flexible operating shaft connected to said worm gear, a gear segment carried by said block above the axis of the transverse shaft, a gear meshing with said segment and adapted to rotate the block on its pivot and a flexible shaft for rotating said last named gear.

HERMAN SCHMITT.